US010393037B2

(12) United States Patent
Ryu et al.

(10) Patent No.: US 10,393,037 B2
(45) Date of Patent: Aug. 27, 2019

(54) METHOD FOR CONTROLLING OF VALVE TIMING OF CONTINUOUS VARIABLE VALVE DURATION ENGINE

(71) Applicants: HYUNDAI MOTOR COMPANY, Seoul (KR); KIA MOTORS CORPORATION, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/839,596

(22) Filed: Dec. 12, 2017

(65) Prior Publication Data

US 2018/0100453 A1 Apr. 12, 2018

Related U.S. Application Data

(63) Continuation-in-part of application No. 15/257,107, filed on Sep. 6, 2016, now Pat. No. 10,047,683.

(30) Foreign Application Priority Data

Dec. 9, 2015 (KR) ........................ 10-2015-0175139
Nov. 20, 2017 (KR) ........................ 10-2017-0154705

(51) Int. Cl.
*F02D 41/00* (2006.01)
*F02D 13/02* (2006.01)
(Continued)

(52) U.S. Cl.
CPC ...... *F02D 41/0002* (2013.01); *F01L 13/0015* (2013.01); *F02D 13/0211* (2013.01);
(Continued)

(58) Field of Classification Search
CPC ............. F01L 13/0015; F01L 2013/111; F02D 13/0215; F02D 13/0226; F02D 13/0261;
(Continued)

(56) References Cited

U.S. PATENT DOCUMENTS 3,633,555 A 1/1972 Raggi
4,552,112 A 11/1985 Nagao et al.
(Continued)

FOREIGN PATENT DOCUMENTS

JP H07-42514 A 2/1995
JP H 07-324610 A 12/1995
(Continued)

OTHER PUBLICATIONS

Final Office Action dated Sep. 6, 2018 from the corresponding U.S. Appl. No. 15/258,154, 15 pages.
(Continued)

*Primary Examiner* — John Kwon
*Assistant Examiner* — Johnny H Hoang
(74) *Attorney, Agent, or Firm* — Brinks Gilson & Lione

(57) ABSTRACT

A method for controlling intake and exhaust valves of an engine includes: Controlling opening and closing timings of the intake and exhaust valves by an intake continuous variable valve timing (CVVT) device and an exhaust CVVT devices; determining, by a controller, target intake and exhaust opening durations of the intake and exhaust valves, and target opening and closing timings of the valves based on an engine load and an engine speed; modifying current intake and exhaust opening durations based on the target opening durations via an intake continuous variable valve duration (CVVD) device and an exhaust CVVD device; adjusting opening or closing timings of the valves to the target opening or closing timings of the valves while maintaining the modified opening durations of the valves.

18 Claims, 11 Drawing Sheets

(51) Int. Cl.

| | |
|---|---|
| ***F01L 13/00*** | (2006.01) |
| *F01L 1/047* | (2006.01) |
| *F01L 1/344* | (2006.01) |
| *F01L 1/34* | (2006.01) |
| *F01L 1/356* | (2006.01) |
| *F01L 1/053* | (2006.01) |
| *F01L 1/26* | (2006.01) |

(52) U.S. Cl.

CPC ..... *F02D 13/0215* (2013.01); *F02D 13/0261* (2013.01); *F01L 1/047* (2013.01); *F01L 1/267* (2013.01); *F01L 1/34* (2013.01); *F01L 1/344* (2013.01); *F01L 1/356* (2013.01); *F01L 2001/0473* (2013.01); *F01L 2001/0537* (2013.01); *F01L 2001/34496* (2013.01); *F01L 2013/103* (2013.01); *F01L 2250/02* (2013.01); *F01L 2800/00* (2013.01); *F01L 2800/01* (2013.01); *F01L 2800/04* (2013.01); *F01L 2820/041* (2013.01); *F01L 2820/042* (2013.01); *F02D 41/009* (2013.01); *F02D 2041/001* (2013.01); *F02D 2041/002* (2013.01); *F02D 2200/0406* (2013.01); *F02D 2200/101* (2013.01); *Y02T 10/18* (2013.01); *Y02T 10/42* (2013.01)

(58) Field of Classification Search

CPC ...... F02D 2200/101; F02D 2200/1002; B60W 10/06; B60W 20/10; F02M 35/104

USPC ......... 123/321–323, 347–348; 701/102, 103, 701/105, 106, 115

See application file for complete search history.

(56) References Cited

U.S. PATENT DOCUMENTS

| | | | |
|---|---|---|---|
| 5,080,055 | A | 1/1992 | Komatsu et al. |
| 5,121,733 | A | 6/1992 | Goto et al. |
| 5,161,497 | A | 11/1992 | Simko et al. |
| 5,224,460 | A | 7/1993 | Havstad et al. |
| 5,419,301 | A | 5/1995 | Schechter |
| 5,421,308 | A | 6/1995 | Hitomi et al. |
| 5,429,100 | A | 7/1995 | Goto et al. |
| 5,450,824 | A | 9/1995 | Yamane et al. |
| 5,469,818 | A | 11/1995 | Yoshioka et al. |
| 5,553,573 | A | 9/1996 | Hara et al. |
| 5,622,144 | A | 4/1997 | Nakamura et al. |
| 5,687,681 | A | 11/1997 | Hara |
| 5,698,779 | A | 12/1997 | Yoshioka |
| 5,778,840 | A | 7/1998 | Murata et al. |
| 5,809,955 | A | 9/1998 | Murata et al. |
| 5,924,334 | A | 7/1999 | Hara et al. |
| 5,992,361 | A | 11/1999 | Murata et al. |
| 6,006,707 | A | 12/1999 | Ito |
| 6,318,343 | B1 | 11/2001 | Nakagawa et al. |
| 6,336,436 | B1 | 1/2002 | Miyakubo et al. |
| 6,553,949 | B1 | 4/2003 | Kolmanovsky et al. |
| 6,619,242 | B2 | 9/2003 | Kaneko |
| 6,837,199 | B2 | 1/2005 | Matsuura et al. |
| 7,793,625 | B2 | 9/2010 | Nakamura et al. |
| 7,823,550 | B2 | 11/2010 | Murata |
| 8,205,587 | B2 | 6/2012 | Murata et al. |
| 8,235,015 | B2 | 8/2012 | Murata |
| 8,677,957 | B2 | 3/2014 | Goto et al. |
| 8,887,691 | B2 | 11/2014 | Chen et al. |
| 9,863,331 | B2 | 1/2018 | Ryu et al. |
| 9,863,340 | B2 | 1/2018 | Ryu et al. |
| 9,874,153 | B2 | 1/2018 | Ryu et al. |
| 9,874,154 | B2 | 1/2018 | Ryu et al. |
| 9,879,619 | B2 | 1/2018 | Ryu et al. |
| 9,889,838 | B2 | 2/2018 | Ryu et al. |
| 9,903,281 | B2 | 2/2018 | Ryu et al. |
| 9,932,883 | B2 | 4/2018 | Iwai et al. |
| 9,932,908 | B2 | 4/2018 | Ryu et al. |
| 9,964,050 | B2 | 5/2018 | Ryu et al. |
| 10,006,378 | B2 | 6/2018 | Ryu et al. |
| 2001/0025615 | A1 | 10/2001 | Nohara et al. |
| 2001/0032605 | A1 | 10/2001 | Kadowaki |
| 2001/0050067 | A1 | 12/2001 | Sato |
| 2002/0043243 | A1 | 4/2002 | Majima |
| 2003/0131805 | A1 | 7/2003 | Yang |
| 2004/0099244 | A1 | 5/2004 | Matsuura et al. |
| 2005/0205069 | A1 | 9/2005 | Lewis et al. |
| 2005/0235933 | A1 | 10/2005 | Arai et al. |
| 2006/0037571 | A1 | 2/2006 | Machida |
| 2006/0266311 | A1 | 11/2006 | Fujii |
| 2007/0181096 | A1* | 8/2007 | Wagner .............. F02D 13/0261 123/299 |
| 2007/0272202 | A1 | 11/2007 | Kuo et al. |
| 2008/0029050 | A1 | 2/2008 | Ichmura et al. |
| 2008/0300773 | A1 | 12/2008 | Winstead |
| 2008/0308053 | A1 | 12/2008 | Tsuchida |
| 2009/0007564 | A1 | 1/2009 | Suzuki et al. |
| 2009/0007867 | A1 | 1/2009 | Tanabe et al. |
| 2009/0031973 | A1 | 2/2009 | Murata |
| 2009/0241877 | A1 | 10/2009 | Hoshikawa |
| 2009/0272363 | A1 | 11/2009 | Yun et al. |
| 2009/0277434 | A1 | 11/2009 | Surnilla |
| 2010/0023242 | A1 | 1/2010 | Kawamura |
| 2010/0217504 | A1 | 8/2010 | Fujii et al. |
| 2012/0000197 | A1 | 1/2012 | Maruyama et al. |
| 2012/0004826 | A1 | 1/2012 | Shimo et al. |
| 2013/0146006 | A1 | 6/2013 | Kim et al. |
| 2013/0146037 | A1 | 6/2013 | Han et al. |
| 2013/0206104 | A1 | 8/2013 | Kuhlmeyer et al. |
| 2013/0213332 | A1 | 8/2013 | Yano et al. |
| 2013/0276731 | A1 | 10/2013 | Yano et al. |
| 2014/0165963 | A1 | 6/2014 | Langham |
| 2015/0034052 | A1 | 2/2015 | Shimizu |
| 2015/0114342 | A1 | 4/2015 | Iwai et al. |
| 2015/0167508 | A1 | 6/2015 | Ha |
| 2015/0167509 | A1 | 6/2015 | Ha |
| 2016/0090877 | A1 | 3/2016 | Kim et al. |
| 2017/0082036 | A1 | 3/2017 | Kwon et al. |
| 2017/0082037 | A1 | 3/2017 | Ryu et al. |
| 2017/0089230 | A1 | 3/2017 | Son et al. |
| 2017/0114680 | A1 | 4/2017 | Kim |
| 2017/0167318 | A1 | 6/2017 | Ryu et al. |
| 2017/0167323 | A1 | 6/2017 | Son et al. |
| 2017/0167393 | A1 | 6/2017 | Ryu et al. |
| 2017/0167394 | A1 | 6/2017 | Ryu et al. |
| 2017/0167396 | A1 | 6/2017 | Ryu et al. |
| 2017/0167398 | A1 | 6/2017 | Ryu et al. |
| 2017/0167399 | A1 | 6/2017 | Ryu et al. |
| 2017/0167400 | A1 | 6/2017 | Ryu et al. |
| 2017/0167401 | A1 | 6/2017 | Ryu et al. |
| 2017/0167402 | A1 | 6/2017 | Ryu et al. |
| 2017/0167403 | A1 | 6/2017 | Ryu et al. |
| 2017/0167404 | A1 | 6/2017 | Ryu et al. |
| 2017/0167405 | A1 | 6/2017 | Ryu et al. |
| 2017/0167406 | A1 | 6/2017 | Ryu et al. |
| 2017/0167407 | A1 | 6/2017 | Ryu et al. |
| 2017/0167408 | A1 | 6/2017 | Ryu et al. |
| 2017/0167409 | A1 | 6/2017 | Ryu et al. |
| 2017/0167414 | A1 | 6/2017 | Ryu et al. |
| 2017/0234243 | A1 | 8/2017 | Ryu et al. |
| 2017/0268435 | A1 | 9/2017 | Ryu et al. |
| 2017/0268436 | A1 | 9/2017 | Ryu et al. |
| 2017/0268437 | A1 | 9/2017 | Ryu et al. |
| 2017/0284235 | A1 | 10/2017 | Son et al. |
| 2017/0284238 | A1 | 10/2017 | Son et al. |
| 2018/0073455 | A1 | 3/2018 | Barra |
| 2018/0100444 | A1 | 4/2018 | Ryu et al. |
| 2018/0100445 | A1 | 4/2018 | Ryu et al. |
| 2018/0100446 | A1 | 4/2018 | Ryu et al. |
| 2018/0100447 | A1 | 4/2018 | Ryu et al. |
| 2018/0100448 | A1 | 4/2018 | Ryu et al. |
| 2018/0100452 | A1 | 4/2018 | Ryu et al. |

(56) References Cited

U.S. PATENT DOCUMENTS

| | | | |
|---|---|---|---|
| 2018/0100453 A1 | 4/2018 | Ryu et al. | |
| 2018/0100454 A1 | 4/2018 | Ryu et al. | |

FOREIGN PATENT DOCUMENTS

| | | | |
|---|---|---|---|
| JP | 2005-098150 | | 4/2005 |
| JP | 2006-046293 | A | 2/2006 |
| JP | 2006-336659 | A | 12/2006 |
| JP | 2010-216464 | A | 9/2010 |
| KR | 10-0321206 | | 1/2002 |
| KR | 10-2009-0013007 | | 2/2009 |
| WO | 2013-171830 | A1 | 11/2013 |

OTHER PUBLICATIONS

Non-Final Office Action dated Sep. 7, 2018 from the corresponding U.S. Appl. No. 15/839,581, 15 pages.

Non-Final Office Action dated Aug. 24, 2018 from the corresponding U.S. Appl. No. 15/840,079, 41 pages.

Non-Final Office Action dated May 16, 2018 from the corresponding U.S. Appl. No. 15/258,043, 9 pages.

Notice of Allowance dated May 16, 2018 from the corresponding U.S. Appl. No. 15/340,742, 52 pages.

Non-Final Office Action dated Dec. 11, 2018 from the corresponding U.S. Appl. No. 15/258,043, 18 pages.

Non-Final Office Action dated Sep. 28, 2018 from the corresponding U.S. Appl. No. 15/839,606, 33 pages.

Non-Final Office Action dated Oct. 5, 2018 from the corresponding U.S. Appl. No. 15/839,626, 19 pages.

Notice of Allowance dated Mar. 18, 2019 from the corresponding U.S. Appl. No. 15/839,581, 14 pages.

Final Office Action dated Mar. 18, 2019 from corresponding U.S. Appl. No. 15/840,079, 31 pages.

Extended European Search Report dated Mar. 4, 2019 from the corresponding European Application No. 18201117.1 (9 pages).

Final Office Action dated Apr. 11, 2019 from corresponding U.S. Appl. No. 15/839,606 (13 pages).

Non-Final Office Action dated Jul. 9, 2019 from the corresponding U.S. Appl. No. 15/839,624, 9 pages.

* cited by examiner

METHOD FOR CONTROLLING OF VALVE TIMING OF CONTINUOUS VARIABLE VALVE DURATION ENGINE

CROSS-REFERENCE TO RELATED APPLICATIONS

This application is a continuation-in-part of U.S. patent application Ser. No. 15/257,107 Sep. 6, 2016 and claims priority to and the benefit of Korean Patent Application Nos. 10-2015-0175139, filed on Dec. 9, 2015, and 10-2017-0154705, filed on Nov. 20, 2017, the entirety each of which are incorporated herein by reference.

FIELD

The present disclosure relates to a system and a method for controlling valve timing of a continuous variable valve duration engine.

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a cylinder by the explosion pressure into rotating motion to actuate an intake valve and an exhaust valve, and while the intake valve is opened, air is suctioned into a combustion chamber, and while an exhaust valve is opened, gas which is combusted in the combustion chamber is exhausted.

To improve the operations of the intake valve and the exhaust valve and thereby improve engine performance, a valve lift and a valve opening/closing time (timing) may be controlled according to a rotational speed or load of an engine. Therefore, a continuous variable valve duration (CVVD) device controlling the opening duration of an intake valve and an exhaust valve of the engine and a continuous variable valve timing (CVVT) device controlling the opening and closing timing of the intake valve and the exhaust valve of the engine have been developed.

The CVVD device may control opening duration of the valve. In addition, the CVVT device may advance or retard the opening or closing timing of the valve in a state that the opening duration of the valve is fixed. That is, if the opening timing of the valve is determined, the closing timing is automatically determined according to the opening duration of the valve.

The above information disclosed in this Background section is only for enhancement of understanding of the background of the present disclosure and therefore it may contain information that does not form the prior art that is already known to a person of ordinary skill in the art.

SUMMARY

The present disclosure provides a system and a method for controlling valve timing of a continuous variable valve duration engine that simultaneously controls duration and timing of the valve being equipped with a continuous variable duration device and a continuous variable valve timing device disposed on intake valve side and exhaust valve side by independently controlling an opening and closing timing of an intake valve and an exhaust valve.

In one form of the present disclosure, a method for controlling intake and exhaust valves of an engine may include: controlling, by an intake continuous variable valve timing (CVVT) device, opening and closing timings of the intake valve; controlling, by an exhaust CVVT device, opening and closing timing of the exhaust valve; determining, by a controller, a target intake opening duration of the intake valve, a target exhaust opening duration of the exhaust valve, and at least one of a target opening timing or a target closing timing of the intake valve and the exhaust valve, based on an engine load and an engine speed; modifying, by an intake continuous variable valve duration (CVVD) device, a current intake opening duration of the intake valve based on the target intake opening duration of the intake valve; modifying, by an exhaust CVVD device, a current exhaust opening duration of the exhaust valve based on the target exhaust opening duration of the exhaust valve; adjusting, by the intake CVVT device, at least one of an opening timing or a closing timing of the intake valve to the at least one of the target opening or the target closing timing of the intake valve while maintaining the modified intake opening duration of the intake valve; and adjusting, by the exhaust CVVT device, at least one of an opening timing or a closing timing of the exhaust valve to the at least one of the target opening or the target closing timing of the exhaust valve while maintaining the modified exhaust opening duration of the intake valve.

In particular, the intake CVVD device advances a current opening timing of the intake valve while simultaneously retarding a current closing timing of the intake valve when the target intake opening duration of the intake valve is longer than a duration between the current opening timing and current closing timing of the intake valve.

In another form, the intake CVVD device retards a current opening timing of the intake valve while simultaneously advancing a current closing timing of the intake valve when the target intake opening duration of the intake valve is shorter than a duration between the current opening timing and current closing timing of the intake valve.

The exhaust CVVD device advances a current opening timing of the exhaust valve while simultaneously retarding a current closing timing of the exhaust valve when the target exhaust opening duration of the exhaust valve is longer than a duration between the current opening timing and current closing timing of the exhaust valve.

The exhaust CVVD device retards a current opening timing of the exhaust valve while simultaneously advancing a current closing timing of the exhaust valve when the target exhaust opening duration of the exhaust valve is shorter than a duration between the current opening timing and current closing timing of the exhaust valve.

During the step of determining the target intake opening duration of the intake valve, the controller sets the target intake opening duration of the intake valve to a first intake opening duration in a first control region where the engine load is between first and second predetermined loads, and the controller controls a valve overlap by using an exhaust valve in the first control region.

In the first control region, the controller fixes the opening and closing timings of the intake valve and the opening timing of the exhaust valve, and controls the closing timing of the exhaust valve to be set up at a maximum value within sustainable combust stability so as to limit a valve overlap.

During the step of determining the target intake and exhaust opening durations, the controller sets the target intake and exhaust opening durations to be predetermined values in a second control region where the engine load is greater than the second predetermined load and equal to or less than a third predetermined load.

The predetermined value of the target intake opening duration and the target exhaust opening duration are set to be a maximum value of opening duration of the intake and exhaust valves.

In the second control region, the controller controls the closing timing of the exhaust valve to be late as the engine load is increased so that the exhaust valve reaches a maximum duration.

The method further includes the step of controlling, by the controller, a manifold absolute pressure (MAP) of an intake manifold to be maintained consistent in a third control region where the engine load is greater than a third predetermined load and equal to or less than a fourth predetermined load.

In the third control region, the controller advances the closing timing of the exhaust valve via the exhaust CVVT device and the closing timing of the intake valve via the intake CVVT device so as to maintain the MAP consistent when the engine load is increased.

The method further includes the step of controlling, by the controller, a wide open throttle valve (WOT), and creating a valve overlap by reducing interference of exhaust in a fourth control region where the engine load is greater than a fourth predetermined load and equal to or less than a fifth predetermined load and the engine speed is between first and second predetermined speeds.

In the fourth control region, the controller controls the closing timing of the exhaust valve to be after a top dead center via the exhaust CVVT device and controls the opening timing of the intake valve to be before the top dead center via the intake CVVT device to generate a valve overlap.

In addition, in the fourth control region, the controller controls the opening timing of the exhaust valve to be approximately at a bottom dead center via the exhaust CVVT device so as to reduce exhaust interference.

In one form, the method may further include the step of controlling, by the controller, a wide open throttle valve (WOT), and controlling the closing timing of the intake valve based on the engine speed in a fifth control region where the engine load is greater than a fourth predetermined load and equal to or less than a fifth predetermined load and the engine speed is greater than a second predetermined speed and equal to or less than a third predetermined speed.

In the fifth control region, the controller retards the opening timing of the intake valve and the closing timing of the intake valve so as to increase an intake duration.

In another form, the controller in the fifth control region controls the opening timing of the exhaust valve to be before a bottom dead center via the exhaust CVVT device to inhibit a valve overlap and controls the closing timing of the exhaust valve to be approximately at a top dead center via the exhaust CVVT device.

As described above, according to one form of the present disclosure, duration and timing of the continuous variable valve are simultaneously controlled, so the engine may be controlled under desirable conditions.

That is, since opening timing and closing timing of the intake valve and the exhaust valve are appropriately controlled, thereby improving fuel efficiency under a partial load condition and engine performance under a high load condition.

In addition, a starting fuel amount may be reduced by increasing a valid compression ratio, and exhaust gas may be reduced by shortening time for heating a catalyst.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, references being made to the accompanying drawings, in which.

Figure 1:
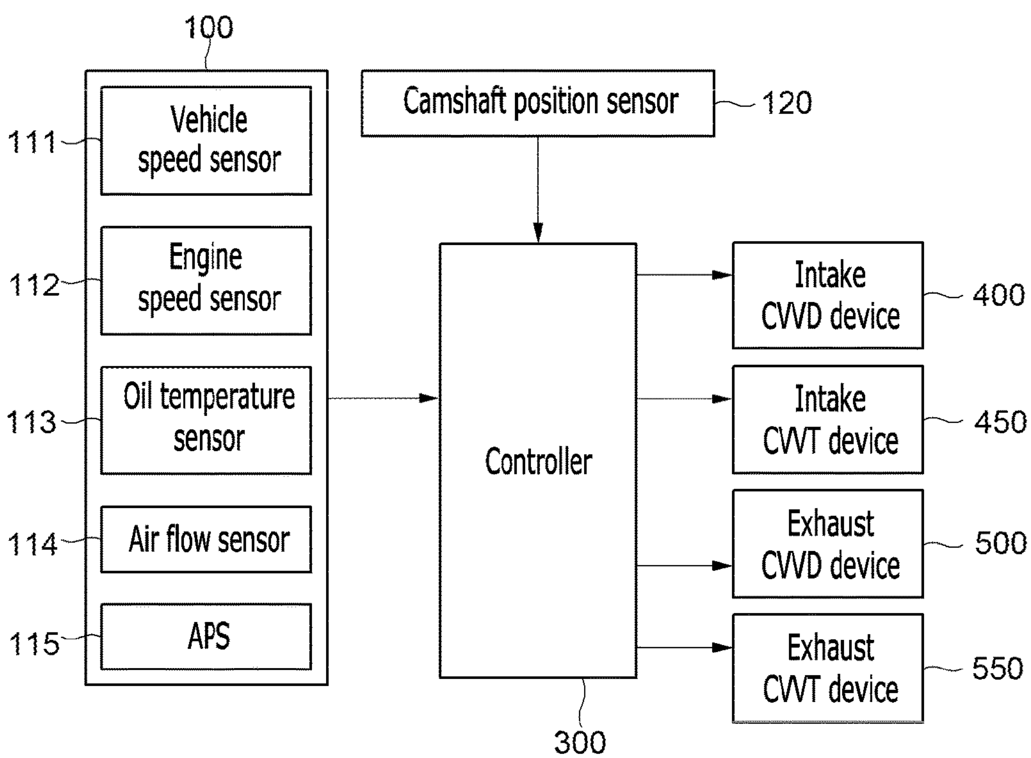
FIG. 1 is a schematic block diagram showing a system for controlling valve timing of a continuous variable valve duration engine.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout this specification and the claims which follow, unless explicitly described to the contrary, the word “comprise” and variations such as “comprises” or “comprising” will be understood to imply the inclusion of stated elements but not the exclusion of any other elements.

It is understood that the term "vehicle" or "vehicular" or other similar terms as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

FIG. 1 is a schematic block diagram showing a system for controlling valve timing of a continuous variable valve duration engine according to one form of the present disclosure.

As shown in FIG. 1, a system for controlling valve timing of a continuous variable valve duration engine includes: a data detector 100, a camshaft position sensor 120, a controller 300, an intake continuous variable valve duration (CVVD) device 400, an intake continuous variable valve timing (CVVT) device 450, an exhaust continuous variable valve duration (CVVD) device 500, and an exhaust continuous variable valve timing (CVVT) device 550.

The data detector 100 detects data related to a running state of the vehicle for controlling the CVVD devices and the CVVT devices, and includes a vehicle speed sensor 111, an engine speed sensor 112, an oil temperature sensor 113, an air flow sensor 114, and an accelerator pedal position sensor 115, although other sensors may be employed.

The vehicle speed sensor 111 detects a vehicle speed, transmits a corresponding signal to the controller 300, and may be mounted at a wheel of the vehicle.

The engine speed sensor 112 detects a rotation speed of the engine from a change in phase of a crankshaft or camshaft, and transmits a corresponding signal to the controller 300.

The oil temperature sensor (OTS) 113 detects temperature of oil flowing through an oil control valve (OCV), and transmits a corresponding signal to the controller 300.

The oil temperature detected by the oil temperature sensor 113 may be determined by measuring a coolant temperature using a coolant temperature sensor mounted at a coolant passage of an intake manifold. Therefore, in one form, the oil temperature sensor 113 may include a coolant temperature sensor, and the oil temperature should be understood to include the coolant temperature.

The air flow sensor 114 detects an air amount drawn into the intake manifold, and transmits a corresponding signal to the controller 300.

The accelerator pedal position sensor (APS) 115 detects a degree in which a driver pushes an accelerator pedal, and transmits a corresponding signal to the controller 300. The position value of the accelerator pedal may be 100% when the accelerator pedal is pressed fully, and the position value of the accelerator pedal may be 0% when the accelerator pedal is not pressed at all.

A throttle valve position sensor (TPS) that is mounted on an intake passage may be used instead of the accelerator pedal position sensor 115. Therefore, in one form, the accelerator pedal position sensor 115 may include a throttle valve position sensor, and the position value of the accelerator pedal should be understood to include an opening value of the throttle valve.

The camshaft position sensor 120 detects a change of a camshaft angle, and transmits a corresponding signal to the controller 300.

Figure 2:
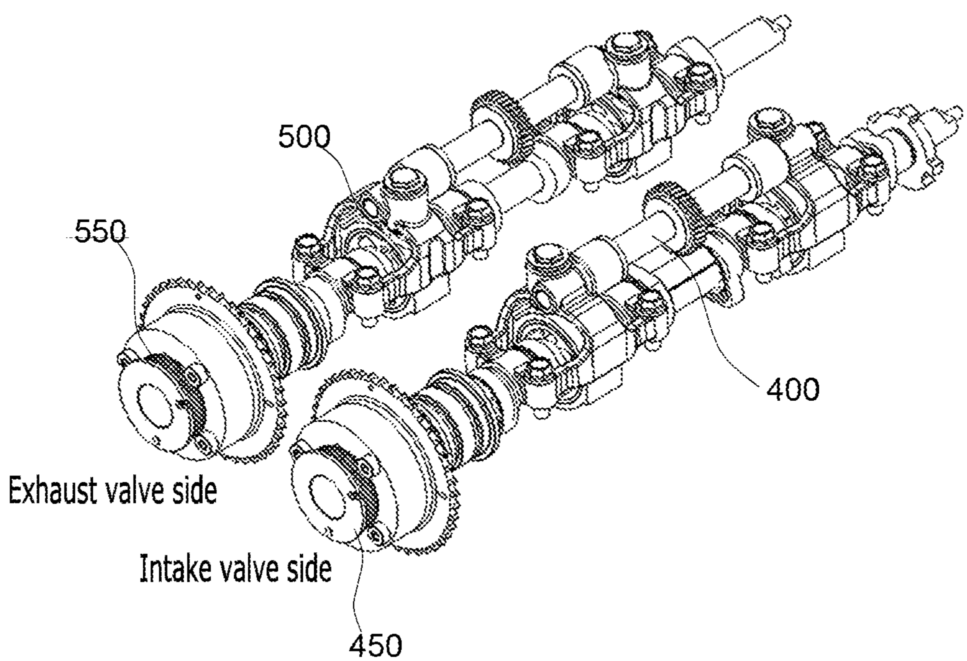
FIG. 2 is a perspective view showing a continuous variable valve duration device and a continuous variable valve timing device which is disposed on intake valve and exhaust valve sides.

FIG. 2 is a perspective view showing a continuous variable valve duration device and a continuous variable valve timing device which is disposed on intake valve and exhaust valve sides according to one form of the present disclosure.

As shown in FIG. 2, the continuous variable valve duration device 400, 500 and the continuous variable valve timing device 450, 550 are mounted at the intake and exhaust valve sides.

The intake continuous variable valve duration (CVVD) device 400 controls an opening duration of an intake valve of the engine according to a signal from the controller 300, the exhaust continuous variable valve duration (CVVD) device 500 controls an opening duration of an exhaust valve of the engine according to a signal from the controller 300.

Figure 3:
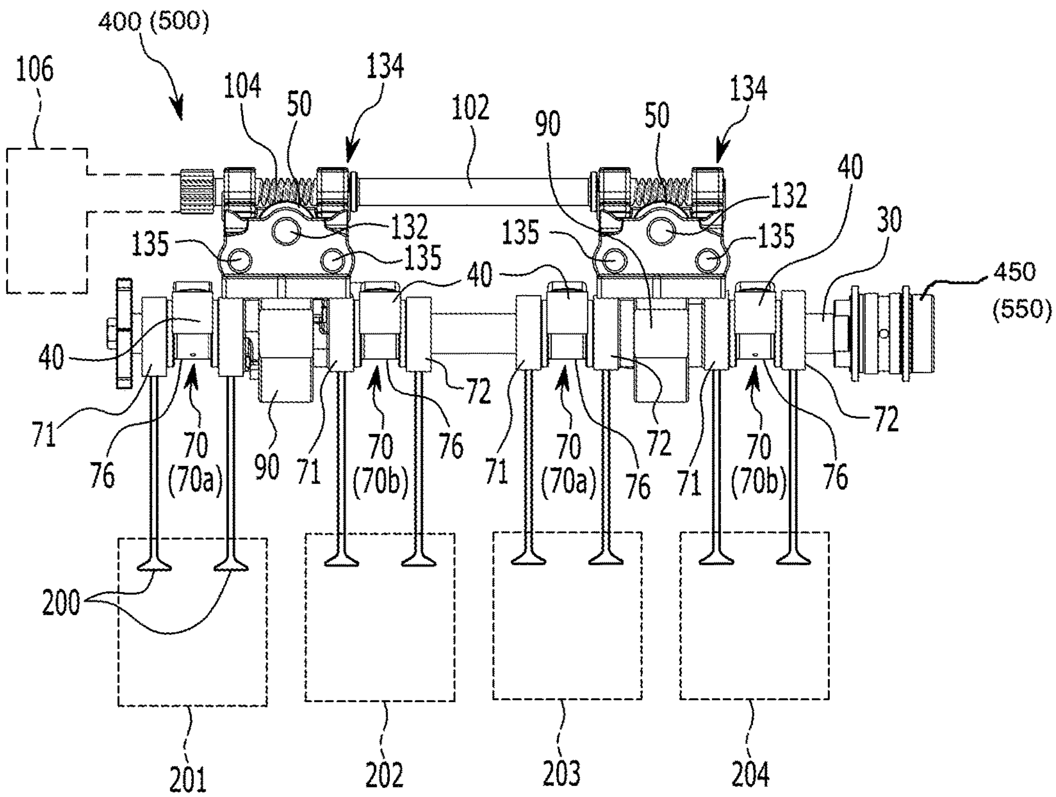
FIG. 3 is a side view of a continuous variable valve duration device assembled with a continuous variable valve timing device in another form.

FIG. 3 is a side view of the CVVD device applied to the intake and exhaust valves in another form as assembled with the CVVT for valves 200 operating with cylinders 201, 202, 203, 204. The intake CVVD device is assembled with the intake CVVT device, and the exhaust CVVD device is assembled with the exhaust CVVT device. In one form, two cams 71 and 72 may be formed on first and second cam portions 70*a* and 70*b*, and a cam cap engaging portion 76 may be formed between the cams 71 and 72 and supported by a cam cap 40. The valve 200 is opened and closed by being in contact with the cams 71 and 72.

As illustrated in FIG. 3, the CVVD device includes: a cam unit 70 in which a cam 71 is formed and into which a cam shaft 30 is inserted; an inner wheel 80 to transfer the rotation of the cam shaft 30 to the cam unit 70 (See, in FIG. 4); a wheel housing 90 in which the inner wheel 80 rotates and movable in a direction perpendicular to the camshaft 30; a guide shaft 132 having a guide thread and provided in a direction perpendicular to the camshaft 30, the guide shaft mounted by a guide bracket 134; a worm wheel 50 having an inner thread engaged with the guide thread and disposed inside the wheel housing 90; and a control shaft 102 formed with a control worm 104 meshing with the worm wheel 50. The control worm 104 is engaged with an outer thread formed on the outer side of the worm wheel 50. The CVVD device further includes a sliding shaft 135 fixed to the guide bracket 134 and guiding the movement of the wheel housing 90.

Figure 4:
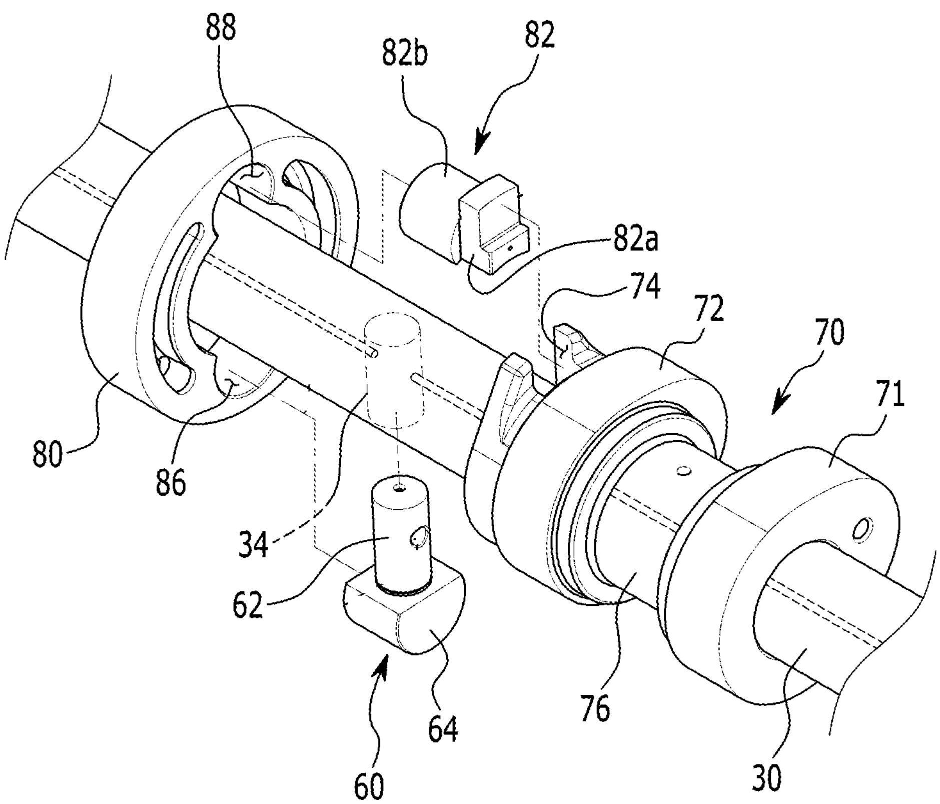
FIG. 4 is a partial view of an inner wheel and a cam unit of a continuous variable valve duration device in one form.

FIG. 4 is a partial view of the inner wheel 80 and the cam unit 70 of the CVVD device of the FIG. 3. Referring to FIG. 4, First and second sliding holes 86 and 88 are formed in the inner wheel 80, and a cam slot 74 is formed in the cam unit 70.

The CVVD device further includes: a roller wheel 60 inserted into the first sliding hole 86 allowing the roller wheel 60 to rotate; and a roller cam 82 inserted into the cam slot 74 and the second sliding hole 88. The roller cam 82 may slide in the cam slot 74 and rotate in the second sliding hole 88.

The roller cam 82 includes: a roller cam body 82*a* slidably inserted into the cam slot 74 and a roller cam head 82*b* rotatably inserted into the second sliding hole 88.

The roller wheel 60 includes: a wheel body 62 slidably inserted into the camshaft 30 and a wheel head 64 rotatably inserted into the first sliding hole 86. A cam shaft hole 34 is formed in the camshaft 30 and a wheel body 62 of the roller wheel 60 is movably inserted into the camshaft hole 34. The structure and operation of the CVVD device discussed above applies to both the intake and exhaust CVVD devices.

Figure 5A:
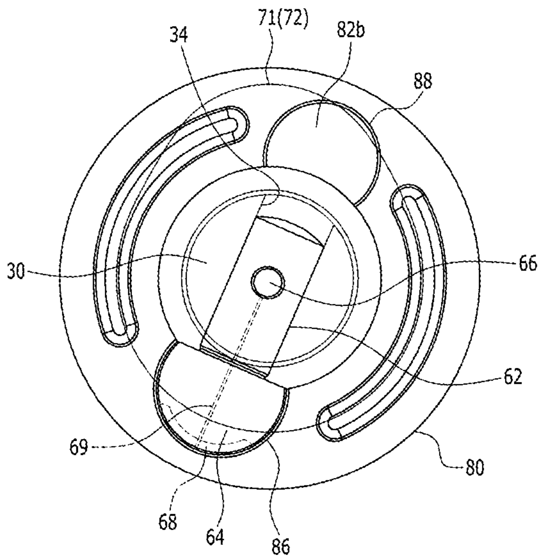
FIGS. 5A-5C are views illustrating the operation of an intake continuous variable valve duration device in FIG. 4.
Figure 5B:
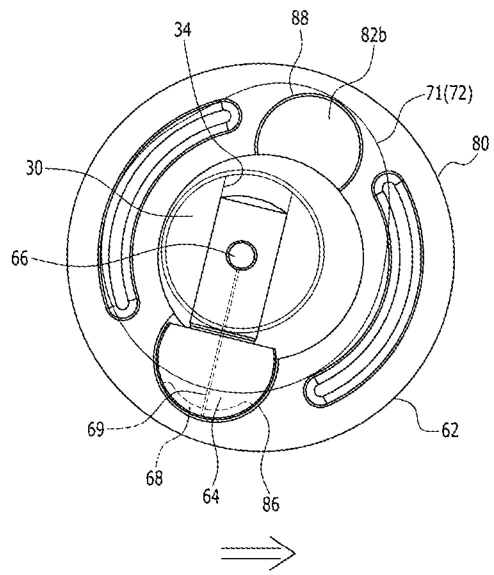
Figure 5C:
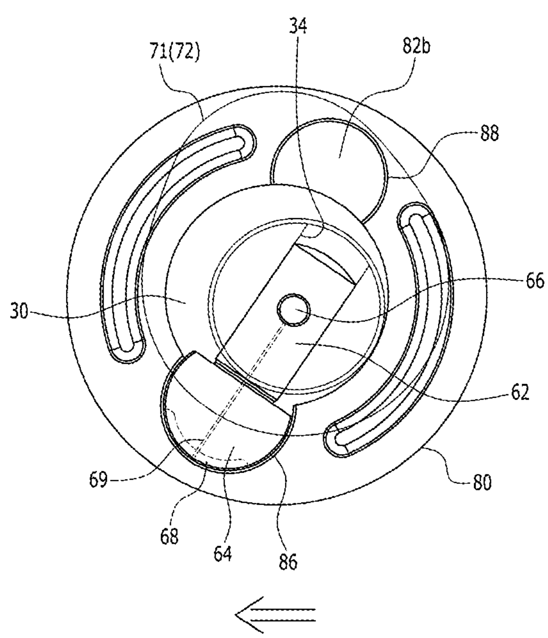

FIGS. 5A-5C illustrate the operation of the CVVD device. FIG. 5A illustrates a neutral state in which the rotational center of the camshaft 30 and the cam unit 70 coincide with each other. In this case, the cams 71 and 72 rotate at the same speed as the camshaft 30. When the controller 300 applies a control signal based on engine load and/or engine speed, a control motor 106 rotates the control shaft 102. Then, the control worm 104 rotates the worm wheel 50 which in turn rotates and moves along the guide thread formed on the guide shaft 132.

Figure 7A:
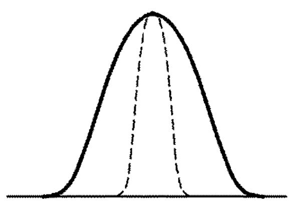
FIGS. 7A-7C are valve profiles of an intake continuous variable valve duration device in one form.
Figure 8A:
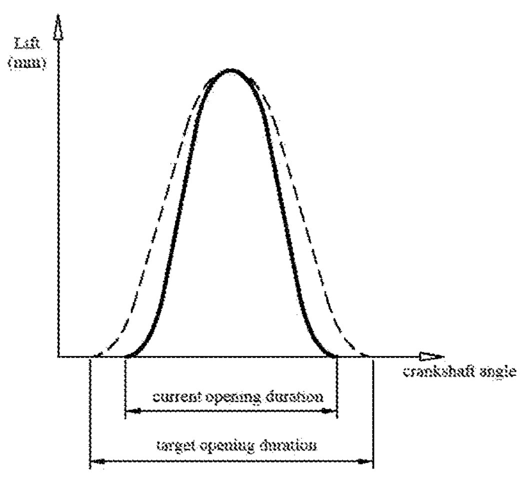
FIGS. 8A-8D illustrate a change of an opening duration and opening and closing timings of a valve.
Figure 8B:
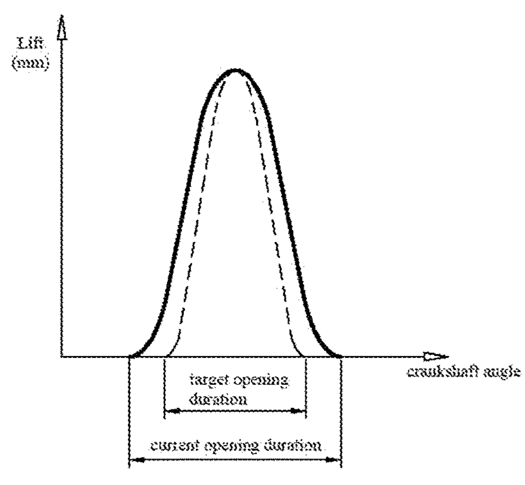

As a result, the worm wheel 50 causes a change to a position of the wheel housing 90 relative to the cam shaft 30. As illustrated in FIGS. 5B and 5C, when the position of the wheel housing 90 moves in one direction with respect to the center of rotation of the camshaft 30, the rotational speed of the cams 71, 72 with respect to the camshaft 30 are changed in accordance with their phases. FIG. 7A and FIG. 8B are drawings showing a valve profile illustrating valve opening duration change by the operation of the CVVD device (i.e., intake CVVD device, exhaust CVVD device). The solid line represents a general valve profile (e.g., a current opening duration), and the dotted line shows the valve profile as a short opening duration (e.g., a target opening duration in FIG. 8B) is applied. FIG. 8A illustrates a changed valve profile when the long opening duration is applied by the CVVD device. The controller 300 determines a target opening duration based on an engine load and an engine speed and controls the CVVD device (i.e., the intake CVVD device, the exhaust CVVD device) to modify current opening and closing timings of the valve based on the target opening duration.

More specifically, as illustrated in FIG. 8B, the CVVD device may retard the current opening timing of the intake valve while simultaneously advancing the current closing timing of the intake valve to shorten the opening duration according to a predetermined value provided by the controller 300. When the controller applies a longer opening duration (i.e., a target opening duration) than the current opening duration, as illustrated in FIG. 8A, the CVVD device may advance the current opening timing of the intake valve while simultaneously retarding the current closing timing of the intake vale so that the modified opening duration becomes longer than the current opening duration. The same operation discussed above applies to the exhaust valve to control an opening duration of the exhaust valve.

Figure 8C:
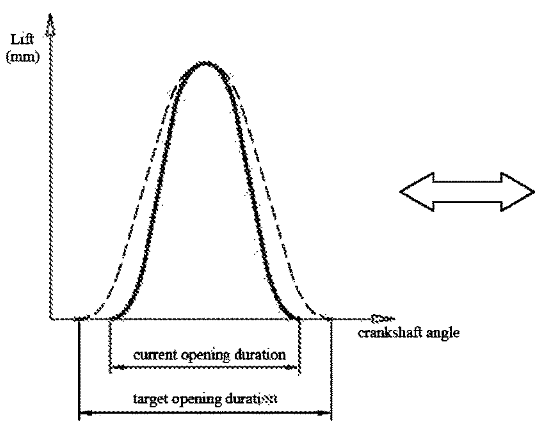
Figure 8D:
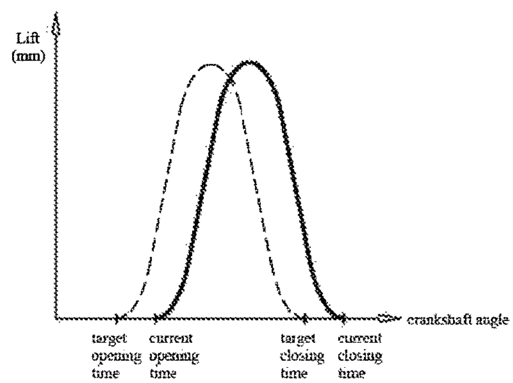

FIGS. 8C and 8D illustrate the relationship between the operation of the CVVD device and the CVVT device. As discussed above, the CVVD device may change the opening duration of a valve (e.g., intake or exhaust valve) whereas the CVVT device may shift a valve profile according to a target opening and/or a target closing timings without change to the period of the valve opening duration. It should be noted that the changing opening duration by the CVVD device may occur after changing valve opening and/or closing timings of intake or exhaust valves by the CVVT device. In another form, the operation of the CVVT device to change the opening and closing timings may occur after the operation of the CVVD device. In still another form, the operation of the CVVD and CVVT devices may perform simultaneously to change the opening duration and the timing of opening and closing of intake or exhaust valves. For example, a current opening duration, which is between current opening and closing timings of an intake valve, may be changed or modified according to a target intake opening duration so that the opening and closing timings of the intake valve are changed to secure the target intake opening duration. The changed opening and closing timings of the intake valve can be changed again according to target opening and closing timings of the intake valve by the intake CVVT device. The same operation applies to the exhaust valve.

Figure 6A:
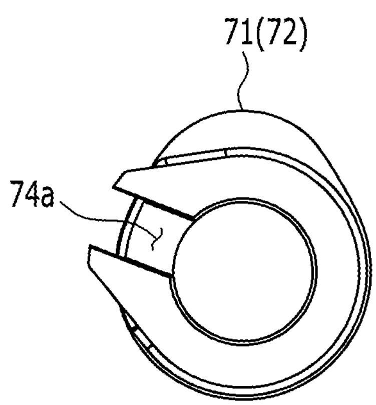
FIGS. 6A and 6B are views illustrating a cam slot of an intake continuous variable valve duration device in exemplary forms.
Figure 6B:
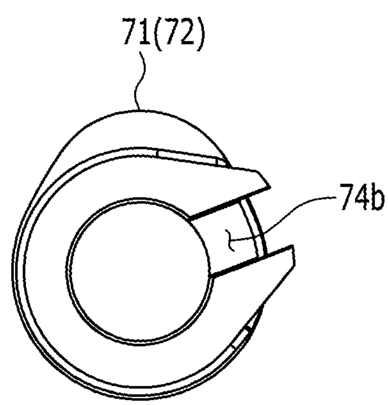
Figure 7B:
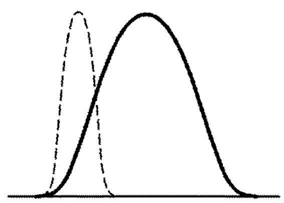
Figure 7C:
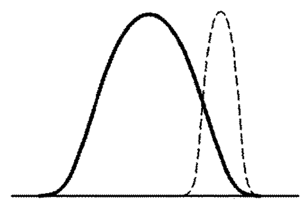

FIGS. 6A and 6B illustrate a view of the cam slot 74*a*, 74*b* of the CVVD device, and FIGS. 7A-7C illustrate valve profiles of the CVVD device in exemplary forms of the present disclosure.

Referring to FIGS. 6A-6B, the cam slot 74*a* may be formed in an advanced position relative to the cam 71, 72, or in another form the cam slot 74*b* may be formed in a retarded position relative to the cam 71, 72. In another form, the cam slot 74*a*, 74*b* may be formed to have the same phase as the lobe of the cam 71, 72. These variations are enable to realize various valve profiles. Based on the position of the cam slot 74*a*, 74*b*, and a contact position between the cam and the corresponding valve (i.e., the intake valve, the exhaust valve), the opening and closing timings of the intake valve (or exhaust valve) may vary. FIG. 7B shows that the CVVD device may advance (for a short opening duration) or retard the current closing timing (for a long opening duration) of the corresponding valve (i.e., intake valve, exhaust valve) by a predetermined value based on the target opening duration of the intake valve or exhaust valve while maintaining the current opening timing of the intake valve or the exhaust valve. In another form, as illustrated in FIG. 7C, the CVVD device may advance (for a long opening duration) or retard (for a short opening duration) the current opening timing of the intake valve or the exhaust valve by a predetermined value based on the target opening duration of the intake valve or the exhaust valve while maintaining the current closing timing of the intake valve or the exhaust valve.

The intake continuous variable valve timing (CVVT) device 450 controls opening and closing timing of the intake valve of the engine according to a signal from the controller 300, and the exhaust continuous variable valve timing (CVVT) device 550 controls opening and closing timing of the exhaust valve of the engine according to a signal from the controller 300.

The controller 300 may classify a plurality of control regions depending on an engine speed and an engine load based on signals from the data detector 100 and camshaft position sensor 120, and controls the intake CVVD and CVVT devices 400 and 450, and the exhaust CVVD and CVVT devices 500 and 550 according to the control regions. Herein, the plurality of control regions may be classified into five control regions.

The controller 300 applies a maximum duration (i.e., a target opening duration) to the intake valve and limits a valve overlap by using the exhaust valve in a first control region, applies the maximum duration to the intake and exhaust valves in a second control region, controls a manifold absolute pressure (MAP) in an intake manifold to be maintained consistently in a third control region, controls a wide open throttle valve (WOT) and creates the valve overlap by reducing an exhaust interference in a fourth control region, and controls a wide open throttle valve (WOT) and controls an intake valve closing (IVC) timing in accordance with the engine speed in a fifth control region.

For these purposes, the controller 300 may be implemented as at least one processor that is operated by a predetermined program, and the predetermined program may be programmed in order to perform each step of a method for controlling valve timing of a continuous variable valve duration engine according to one form of the present disclosure.

Various forms described herein may be implemented within a recording medium that may be read by a computer or a similar device by using software, hardware, or a combination thereof, for example.

The hardware of the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform any other functions.

The software such as procedures and functions of the forms described in the present disclosure may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to one form of the present disclosure will be described in detail with reference to FIG. 9A to FIG. 12C.

Figure 9A:
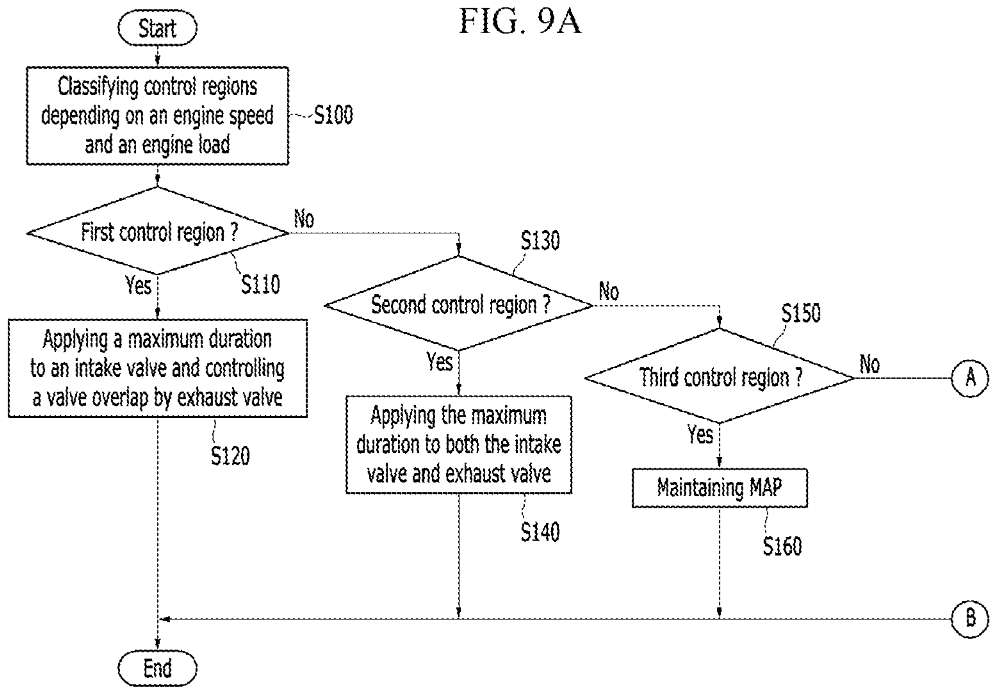
FIGS. 9A and 9B are flowcharts showing a method for controlling valve timing of a continuous variable valve duration engine.
Figure 9B:
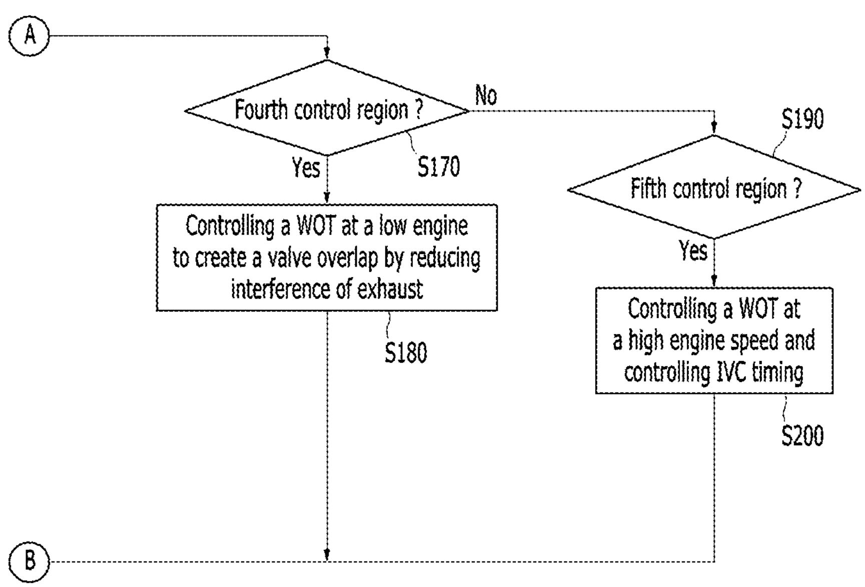
Figure 10:
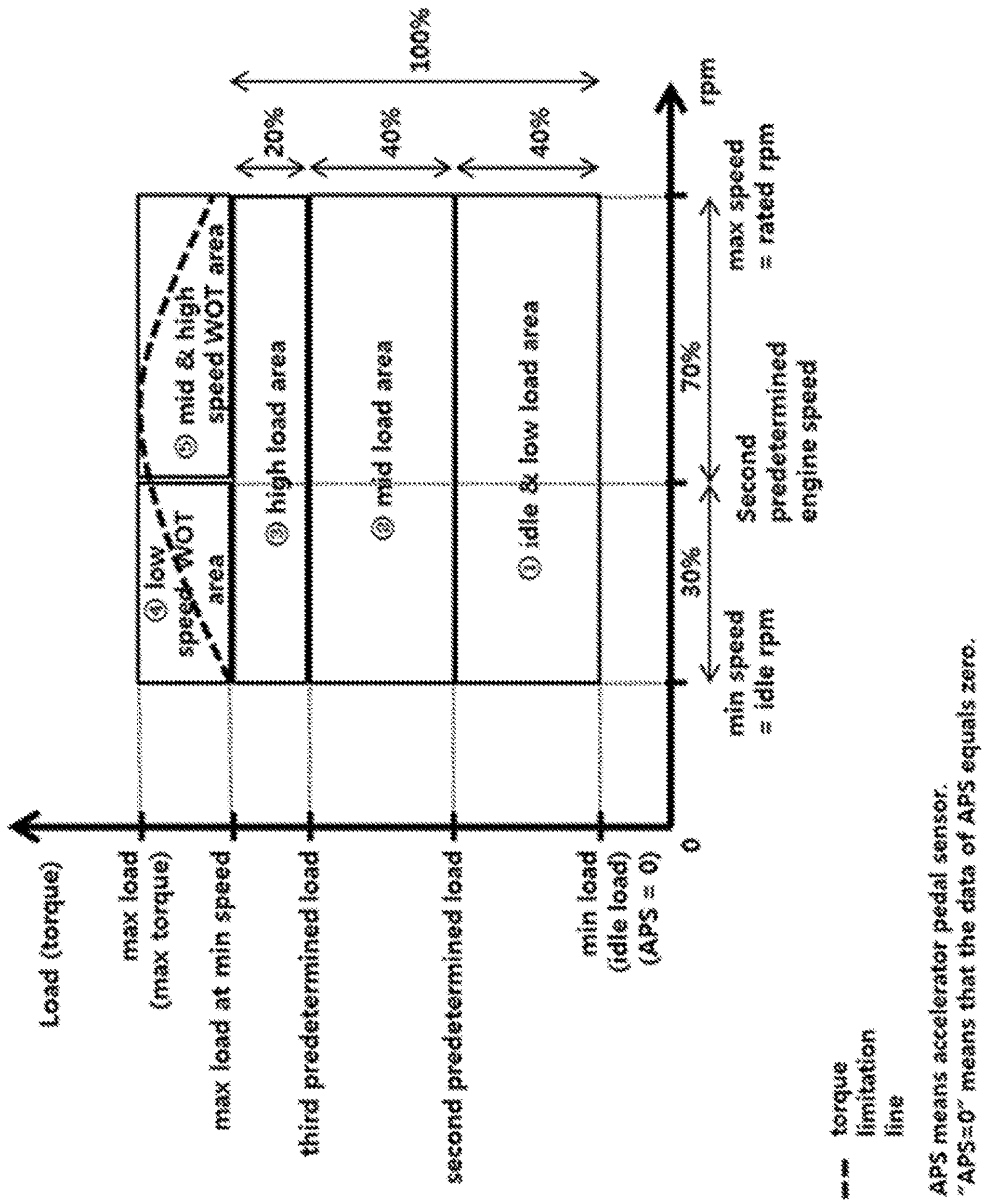
FIG. 10 is a schematic diagram illustrating control regions in one form.

FIG. 9A and FIG. 9B are flowcharts showing a method for controlling valve timing of a continuous variable valve duration engine, and FIG. 10 is a schematic block diagram of showing control regions based on engine load (e.g., engine torque) and engine speed.

Figure 11A:
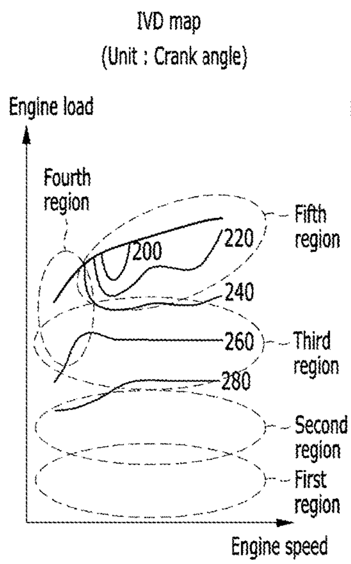
FIGS. 11A-11C are graphs showing duration, opening timing, and closing timing of an intake valve depending on an engine load and an engine speed.
Figure 11B:
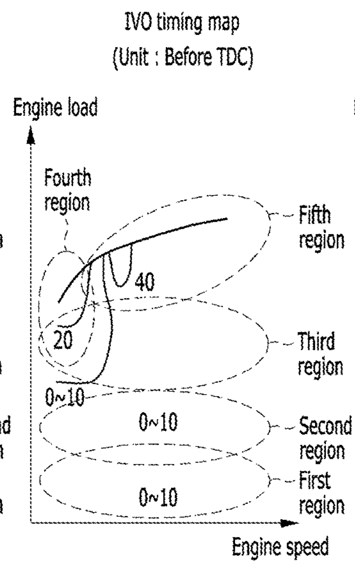
Figure 11C:
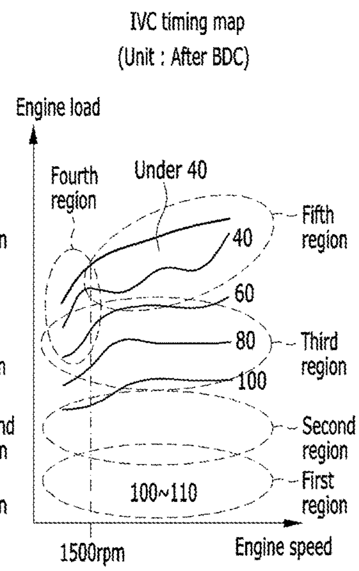
Figure 12A:
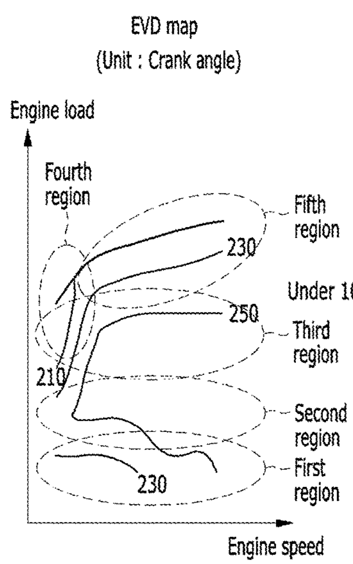
FIGS. 12A-12C are graphs showing duration, opening timing, and closing timing of an exhaust valve depending on an engine load and an engine speed.
Figure 12B:
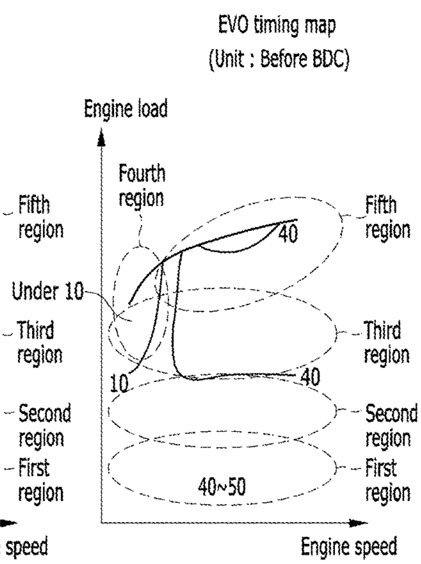
Figure 12C:
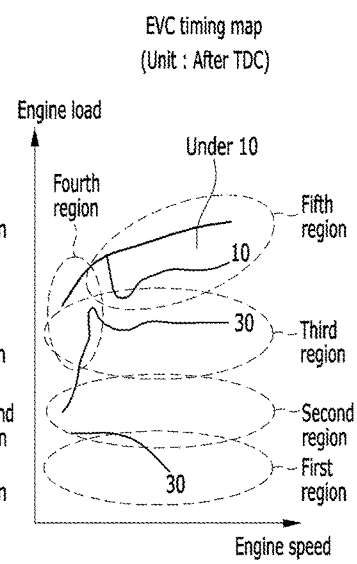

FIGS. 11A-11C are graphs showing duration, opening timing, and closing timing of an intake valve depending on an engine load and an engine speed, and FIGS. 12A-12C are graphs showing duration, opening timing, and closing timing of an exhaust valve depending on an engine load and an engine speed.

As shown in FIG. 9A and FIG. 9B, a method for controlling valve timing of a continuous variable valve duration engine according to the present disclosure starts with classifying a plurality of control regions depending on an engine speed and an engine load by the controller 300 at step S100.

The control regions will be described with reference to FIGS. 11A-11C and FIGS. 12A-12C. The first to fifth control regions (e.g., first, second, third, fourth, and fifth control regions) are indicated in FIG. 10, and FIGS. 11A-11C and FIGS. 12A-12C in more detail. FIG. 10 schematically describes the control regions based on the engine load (e.g., engine torque) and engine speed (e.g., revolutions per minutes "rpm"). However, the control regions may vary based on engine type or engine size. Mixed control may be performed at the boundary of each region to minimize the control impact of the engine. Accordingly, the range of each region shown in the present application is exemplary, and the classification of each region may be varied.

The controller 300 may determine a control region as the first control region (namely, ① an idling region and low-load condition) when the engine load is between a first predetermined load (e.g., a minimum engine torque) and a second predetermined load, a second control region (namely, ② an mid-load condition) when the engine load is greater than the second predetermined load and equal to or less than a third predetermined load, and a third control region (namely, ③ a high-load condition) where the engine load is greater than the third predetermined load and less than a fourth predetermined load.

In addition, the controller 300 may determine a control region as the fourth control region (namely, ④ a low-speed wide open throttle "WOT" condition) when the engine load is greater than the fourth predetermined load (i.e., a maximum torque at the idle rpm) and equal to or less than the fifth predetermined load (i.e., a maximum torque) and the engine speed is between a first predetermined speed (i.e., the idle rpm) and a second predetermined speed, and determine the fifth control region (namely, ⑤ a mid-high speed WOT condition) when the engine load is greater than the fourth predetermined load and equal to or less than the fifth predetermined load and the engine speed is greater than the second predetermined speed and equal to or less than a third predetermined speed (i.e., an engine maximum rpm).

Referring to FIG. 10, the first predetermined load (e.g., a minimum engine torque) is measured when a input from the APS is zero "0," and the second to fifth predetermined loads, and the second and third predetermined engine speeds may be calculated by the following equations:

$$\text{Second predetermined load} = \min\_L + (2/5) \times (\max\_L@\text{idle\_rpm} - \min\_L);$$

$$\text{Third predetermined load} = \min\_L + (4/5) \times (\max\_L@\text{idle\_rpm} - \min\_L);$$

$$\text{Fourth predetermine load} = \max\_L@\text{idle\_rpm};$$

$$\text{Fifth predetermined load} = \max\_L;$$

$$\text{Second predetermined engine speed} = \min\_S + (3/10) \times (\max\_S - \min\_S); \text{ and}$$

$$\text{Third predetermined engine speed} = \max\_S,$$

where, min_L is the minimum engine torque; max_L@idle_rpm is a maximum engine torque at a minimum engine rpm (i.e., Idle rpm); max_L is a maximum engine torque; min_S is a minimum engine rpm (e.g., Idle rpm); and max_S is a maximum engine rpm.

Meanwhile, referring the FIG. 11A to FIG. 12C, a crank angle is marked in an intake valve duration (IVD) map and an exhaust valve duration (EVD) map, which indicating the opening time of the intake valve and exhaust valve. For example, regarding the IVD map in the FIG. 11A, a curved line written as a number 200 at inner side of the fifth region means that the crank angle is approximately 200 degrees, a curved lined marked as a number 220 at outer side of the number 200 means that the crank angle is approximately 220 degrees. Although not shown in the drawing, the crank angle which is more than approximately 200 less than about 220 is positioned between the curved line of the number 200 and the curved line of the number 220.

In addition, a unit of number designated in an intake valve opening (IVO) timing map is before a top dead center (TDC), a unit of number designated in an intake valve close (IVC) timing map is after a bottom dead center (BDC), a unit of number designated in an exhaust valve opening (EVO)

timing map is before BDC, and a unit of number designated in an exhaust valve closing (EVC) map is after TDC.

Each region and curved line in the FIG. 11A to FIG. 12C are one form of the present disclosure, it may be modified within the technical idea and scope of the present disclosure.

Referring to the FIGS. 9A to 12C, the control regions are classified according to the engine speed and load in the step of S100. After that, the controller 300 determines whether the engine state is under the first control region at step S110.

In the step of S110, if the engine load is between a first predetermined load (i.e., minimum load, or idle load) and the second predetermined load, the controller 300 determines that the engine state is under the first control region. At this time, the controller 300 applies a maximum duration or a first intake opening duration to the intake valve and controls the valve overlap between the exhaust valve and intake valve at step S120. The valve overlap is a state in which the intake valve is opened and the exhaust valve is not closed yet.

In other words, when the engine is under low load, then the controller 300 may control both the intake valve opening (IVO) timing and the intake valve close (IVC) timing being fixed such that the intake valve has a maximum duration value. In other words, the controller 300 controls the intake CVVD device to adjust a current opening duration to the first intake opening duration by advancing the IVO timing and retarding the IVC timing.

As shown in FIGS. 11A-11C, the first control region may be approximately 0 to 10 degrees before TDC in the IVO timing map and approximately 100 to 110 degrees after BDC in the IVC timing map.

Also, the controller 300 may control the EVO timing to be fixed and set up the EVC timing. Meanwhile, as the valve overlap is increased, the fuel consumption is cut, whereas the combust stability is deteriorated. Accordingly, properly setting the valve overlap is desired. However, in another form of the present disclosure, it is possible to get highly improved fuel-efficiency by setting a desirable valve overlap up, which fixing the EVO timing and controlling the EVC timing to be set up at a maximum value within sustainable combust stability. The timing value may be determined by predetermined map.

For example, as shown in FIGS. 12A-12C, the EVO timing may be fixed at approximately 40 to 50 degrees before BDC, the EVC timing may be established by moving the degrees thereof in an after TDC direction. The EVC timing may be a maximum value such that the combust stability is sustainable.

When the current engine state does not belong to the first control region at the step S110, the controller 300 determines whether the current engine state belongs to the second control region at step S130. However, each of the control regions may be determined immediately by the controller 300 based on the engine load and/or engine speed.

In the step of S130, if the engine load is greater than the second predetermined load and equal to or less than the third predetermined load, the controller 300 determines that the engine state is under the second control region. At this time, the controller 300 controls both the intake valve and exhaust valve respectively having a maximum duration consistently at step S140.

The controller 300 may control the EVC timing to be late as the engine load is increased in order that the exhaust valve reaches the maximum duration.

Herein, the controller 300 fixes the IVO timing and IVC timing for applying the maximum duration to the intake valve in the first control region, thereby controller 300 may apply the maximum duration to the exhaust valve such that the difference between the atmospheric pressure and the pressure of the intake manifold is maintained at a predetermined value. For example, a manifold absolute pressure (MAP), which is the difference between atmospheric pressure and pressure of intake manifold, may be approximately 950 hPa.

When the current engine state does not belong to the second control region at the step S130, the controller 300 determines whether the current engine state belongs to the third control region at step S150.

In the step of S150, if the engine load is greater than a third predetermined load and equal to or less than a fourth predetermined load (i.e., a maximum torque at engine idle rpm), the controller 300 determines that the engine state is under the third control region. At this time, the controller 300 controls the MAP to be maintained consistently at step S160.

In other words, the controller 300 applies the maximum duration to the intake valve and the exhaust valve and controls the MAP to be maintained consistently in the second control region. And after, when the engine state is under the third control region as the engine load is increased, the controller 300 may advance both the EVC timing and IVC timing and controls the MAP to be maintained consistently.

Referring to the FIGS. 11A to 12C, the IVC timing and the EVC timing are advanced in the third region so as to maintain the MAP. In this case, if the EVC timing is advanced in a state that the IVO timing is fixed, then the valve overlap may be shorten, thereby the knocking may be decreased.

When the current engine state does not belong to the third control region at the step S150, the controller 300 determines whether the current engine state belongs to the fourth control region at step S170. In another form, the controller 300 may determine the condition for the fourth control region without performing the step of determining the first, second and third control regions.

If the engine load is greater than the fourth predetermined load and equal to or less than a fifth predetermined load (i.e., engine maximum torque) and the engine speed is between a first predetermined speed (i.e., idle rpm) and a second predetermined speed in the S170, the controller 300 determines that the engine state is under the fourth control region. At this time, the controller 300 fully opens a throttle valve and controls to create valve overlap by reducing interference of exhaust at step S180.

In the fourth control region, the engine speed is less than the predetermined speed (e.g., approximately 1500 rpm) and back pressure is not high. Accordingly, it is desired to generate scavenging pressing combustion gas out by lowering pressure of exhaust port through reducing exhaust interference.

Therefore, the controller 300 controls IVO timing and EVC timing to create the valve overlap so as to generate the scavenging in the section of the valve overlap. In other words, as shown in FIGS. 11A-11C, the controller 300 may control the IVO timing to before a top dead center, and may control EVC timing to after top dead center as shown in FIGS. 12A-12C.

Further, the controller 300 may control the EVO timing to reduce exhaust interference. In other words, as shown in FIGS. 12A-12C, as the EVC timing may be controlled to after a top dead center, the EVO timing may approach to the bottom dead center. Accordingly, short exhaust duration may be used in the fourth control region.

When the current engine state does not belong to the fourth control region at the step S170, the controller 300 determines whether the current engine state belongs to the fifth control region at step S190.

In the S190, if the engine load is greater than the fourth predetermined load and equal to or less than the fifth predetermined load and the engine speed is greater than the second predetermined speed and equal to or less than a third predetermined speed (i.e., a maximum rpm), then the controller 300 determines that the engine state is under the fifth control region. At this time, the controller 300 fully opens a throttle valve and controls the IVC timing in accordance with the engine speed at step S200.

In other words, the controller 300 may retard the IVO timing and the IVC timing as the engine speed is increased such that the intake duration is prolonged. For example, since the IVC timing is most powerful element when the engine speed is greater than or equal to the predetermined speed (e.g., approximately 1500 rpm) in the fifth control region, the controller 300 may control the IVC timing as an optimal value based on the engine speed in one form of the present disclosure. Referring to the FIGS. 11A-11C, the IVC timing may be gradually retarded from at an angle of approximately 20 degrees when the engine speed is less then predetermined speed (low speed) to at angle of approximately 60 degrees as the engine speed is increased.

At the same time, in the medium speed (e.g., approximately 1500-3000 rpm), the controller 300 may create valve underlap by retarding the IVO timing. Thereby, the intake duration may be decreased in a certain period, and after may be increased as the engine speed is increased.

In addition, the controller 300 may control the EVO timing to before the bottom dead center to inhibit or prevent from generating valve overlap and may control the EVC timing close to the top dead center.

As back pressure is increased, the scavenging generated in the fourth control region may be disappeared, thereby, it is not necessary to generate valve overlap. Accordingly, as shown in FIGS. 12A-12C, the EVO timing may be an angle in a range of approximately 30-40 degrees before the bottom dead center favorable to pumping exhaust and the EVC timing may be close to the top dead center.

As described above, according to an exemplary form of the present disclosure, duration and timing of the continuous variable valve are simultaneously controlled, so the engine may be controlled under desirable conditions.

That is, since opening timing and closing timing of the intake valve and the exhaust valve are appropriately controlled, thereby improving fuel efficiency under a partial load condition and engine performance under a high load condition. In addition, a starting fuel amount may be reduced by increasing a valid compression ratio, and exhaust gas may be reduced by shortening time for heating a catalyst.

While this present disclosure has been described in connection with what is presently considered to be practical forms, it is to be understood that the present disclosure is not limited to the disclosed forms. On the contrary, it is intended to cover various modifications and equivalent arrangements included within the spirit and scope of the present disclosure.

What is claimed is:

1. A method for controlling intake and exhaust valves of an engine, the method comprising:

controlling, by an intake continuous variable valve timing (CVVT) device, opening and closing timings of the intake valve;

controlling, by an exhaust CVVT device, opening and closing timing of the exhaust valve;

determining, by a controller, a target intake opening duration of the intake valve, a target exhaust opening duration of the exhaust valve, and at least one of a target opening timing or a target closing timing of the intake valve and the exhaust valve, based on an engine load and an engine speed;

modifying, by an intake continuous variable valve duration (CVVD) device, a current intake opening duration of the intake valve while maintaining a maximum amount of a valve lift of the intake valve at a same level based on the target intake opening duration of the intake valve;

modifying, by an exhaust CVVD device, a current exhaust opening duration of the exhaust valve while maintaining a maximum amount of a valve lift of the exhaust valve at a same level based on the target exhaust opening duration of the exhaust valve;

adjusting, by the intake CVVT device, at least one of an opening timing or a closing timing of the intake valve to the at least one of the target opening or the target closing timing of the intake valve while maintaining the modified intake opening duration of the intake valve; and adjusting, by the exhaust CVVT device, at least one of an opening timing or a closing timing of the exhaust valve to the at least one of the target opening or the target closing timing of the exhaust valve while maintaining the modified exhaust opening duration of the intake valve.

2. The method of claim 1, wherein the intake CVVD device advances a current opening timing of the intake valve while simultaneously retarding a current closing timing of the intake valve when the target intake opening duration of the intake valve is longer than a duration between the current opening timing and current closing timing of the intake valve.

3. The method of claim 1, wherein the intake CVVD device retards a current opening timing of the intake valve while simultaneously advancing a current closing timing of the intake valve when the target intake opening duration of the intake valve is shorter than a duration between the current opening timing and current closing timing of the intake valve.

4. The method of claim 1, wherein the exhaust CVVD device advances a current opening timing of the exhaust valve while simultaneously retarding a current closing timing of the exhaust valve when the target exhaust opening duration of the exhaust valve is longer than a duration between the current opening timing and current closing timing of the exhaust valve.

5. The method of claim 1, wherein the exhaust CVVD device retards a current opening timing of the exhaust valve while simultaneously advancing a current closing timing of the exhaust valve when the target exhaust opening duration of the exhaust valve is shorter than a duration between the current opening timing and current closing timing of the exhaust valve.

6. The method of claim 1, wherein, during the step of determining the target intake opening duration of the intake valve, the controller sets the target intake opening duration of the intake valve to a first intake opening duration in a first control region where the engine load is between first and second predetermined loads, and the controller controls a valve overlap by using the exhaust valve in the first control region.

7. The method of claim 6, wherein, in the first control region, the controller fixes the opening and closing timings of the intake valve and the opening timing of the exhaust valve, and controls the closing timing of the exhaust valve to be set up at a maximum value within sustainable combust stability so as to limit a valve overlap.

8. The method of claim 1, wherein, during the step of determining the target intake and exhaust opening durations, the controller sets the target intake and exhaust opening durations to be predetermined values in a second control region where the engine load is greater than the second predetermined load and equal to or less than a third predetermined load.

9. The method of claim 8, wherein the predetermined value of the target intake opening duration and the target exhaust opening duration are set to be a maximum value of opening duration of the intake and exhaust valves, respectively.

10. The method of claim 9, wherein, in the second control region, the controller controls the closing timing of the exhaust valve to be late as the engine load is increased so that the exhaust valve reaches a maximum duration.

11. The method of claim 1, further comprising the step of controlling, by the controller, a manifold absolute pressure (MAP) of an intake manifold to be maintained consistent in a third control region where the engine load is greater than a third predetermined load and equal to or less than a fourth predetermined load.

12. The method of claim 11, wherein, in the third control region, the controller advances the closing timing of the exhaust valve via the exhaust CVVT device and the closing timing of the intake valve via the intake CVVT device so as to maintain the MAP consistent when the engine load is increased.

13. The method of claim 1, further comprising the step of controlling, by the controller, a wide open throttle valve (WOT), and creating a valve overlap by reducing interference of exhaust in a fourth control region where the engine load is greater than a fourth predetermined load and equal to or less than a fifth predetermined load and the engine speed is between first and second predetermined speeds.

14. The method of claim 13, wherein, in the fourth control region, the controller controls the closing timing of the exhaust valve to be after a top dead center via the exhaust CVVT device and controls the opening timing of the intake valve to be before the top dead center via the intake CVVT device to generate a valve overlap.

15. The method of claim 13, wherein, in the fourth control region, the controller controls the opening timing of the exhaust valve to be approximately at a bottom dead center via the exhaust CVVT device so as to reduce exhaust interference.

16. The method of claim 1, further comprising the step of controlling, by the controller, a wide open throttle valve (WOT), and controlling the closing timing of the intake valve based on the engine speed in a fifth control region where the engine load is greater than a fourth predetermined load and equal to or less than a fifth predetermined load and the engine speed is greater than a second predetermined speed and equal to or less than a third predetermined speed.

17. The method of claim 16, wherein, in the fifth control region, the controller retards the opening timing of the intake valve and the closing timing of the intake valve so as to increase an intake duration.

18. The method of claim 16, wherein, in the fifth control region, the controller controls the opening timing of the exhaust valve to be before a bottom dead center via the exhaust CVVT device to inhibit a valve overlap and controls the closing timing of the exhaust valve to be approximately at a top dead center via the exhaust CVVT device.

* * * * *